No. 725,248. PATENTED APR. 14, 1903.
T. HENRY.
WASHING MACHINE.
APPLICATION FILED SEPT. 23, 1902.
NO MODEL.
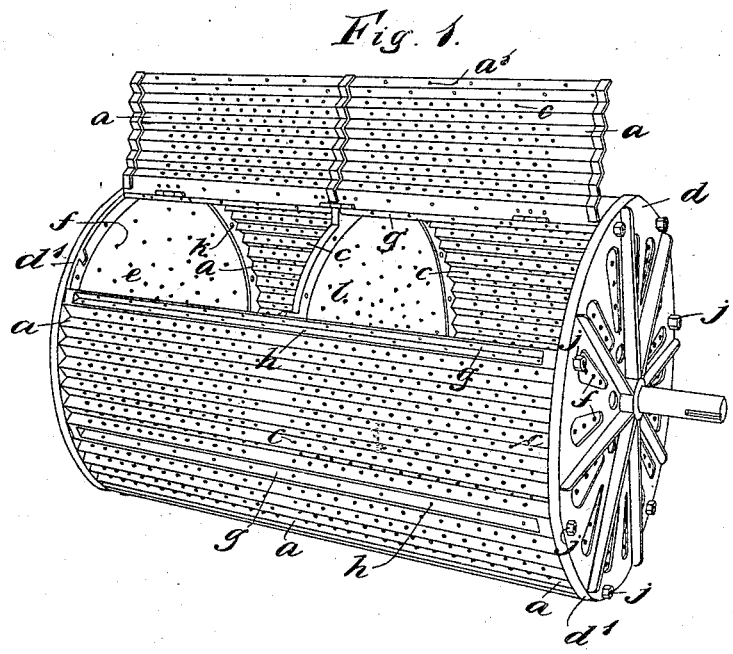
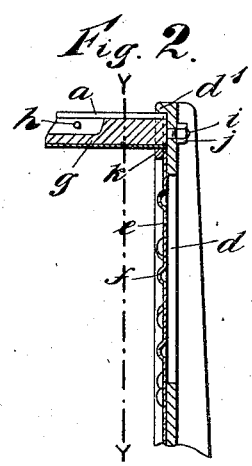
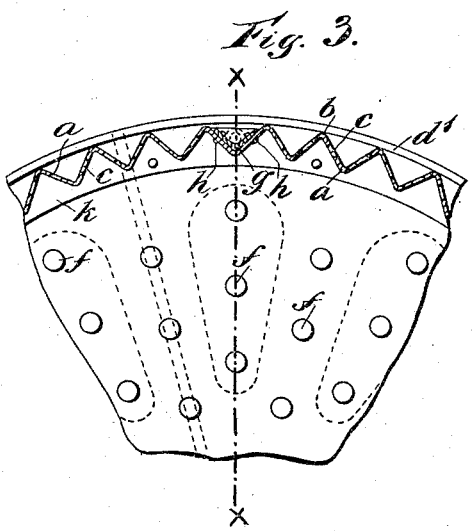
Witnesses — Inventor —

UNITED STATES PATENT OFFICE.

THOMAS HENRY, OF LONDON, ENGLAND, ASSIGNOR, BY MESNE ASSIGN-MENTS, TO BOURNE-HENRY ENGINEERING COMPANY, LIMITED, OF LONDON, ENGLAND.

WASHING-MACHINE.

SPECIFICATION forming part of Letters Patent No. 725,248, dated April 14, 1903.

Application filed September 23, 1902. Serial No. 124,558. (No model.)

*To all whom it may concern:*

Be it known that I, THOMAS HENRY, a subject of the King of Great Britain, residing at London, England, have invented certain new and useful Improvements in Washing-Machines; and I do hereby declare the following to be a full, clear, and exact description of the invention, such as will enable others skilled in the art to which it appertains to make and use the same.

This invention relates to machines for washing and cleaning clothes, textile fabrics, and other articles, particularly to machines of a rotatory type.

It has for its object the construction of a machine possessing a highly-efficient rubbing-surface and rinsing capacity.

In order that the said invention may be fully understood, I will now proceed to describe the same with the aid of the accompanying sheet of drawings, in which—

Figure 1 is a perspective view of the rotating drum of a cylindrical machine constructed in accordance with my invention; Fig. 2, a partial longitudinal section taken at one end of the drum shown in Fig. 1 and on line X X of Fig. 3, and Fig. 3 a section taken on line Y Y of Fig. 2 looking from left to right in that figure.

I make the rotating drum, Fig. 1, of the machine of cylindrical form, the periphery being made of sheet copper, brass, or other suitable metal bent to form a continuous series of corrugations *a* with flat or nearly flat sides, the connecting angles or corners of which are more or less rounded, as shown at *b* in Fig. 3, and the sides of the corrugations are perforated, as shown at *c*, to admit of the free passage of water, lye, or other liquid into and out of the drum.

The ends *d* of the drum or cylinder I make of cast-iron or other suitable metal, covered on the inside with sheet brass or copper *e*, embossed, as shown at *f*, for example, to give additional rubbing-surface. The two ends are tied together and the whole drum or cylinder stiffened at intervals by means of stout angle-irons *g*, which conveniently lie in the corrugations on the outside of the cylinder and are riveted to the sheet-brass or other metal forming the cylinder, as shown at *h*, for example. The ends of these angle-irons *g* terminate in screwed pins or studs *i*, passing through the ends *d* and secured by nuts *j*. The corrugations *a* of the drum or cylinder are further braced externally by the flanges *d'* of the cast-iron ends *d* and internally by the gun-metal or other suitable rings *k*, riveted to the ends *d* and shaped on their external circumferences to fit into the corrugations *a* of the cylinder, as shown most clearly in Figs. 2 and 3. The portion of the cylinder forming the door *a'* thereof is hinged to one of the tying and stiffening angle-irons *g*, as shown in Fig. 1, and may be stiffened and strengthened in any suitable way. The cylinder may also be strengthened by one or more transverse partitions *l*, if desired.

It will be understood that the rotating drum is to be inclosed in an outer casing in the usual manner. This outer casing is not shown in the drawings, as it may be of any well-known construction and forms no part of my present invention.

I am aware that it is not novel to make the rotating drums of washing-machines with ordinary corrugations consisting of curves intersecting one another, with or without perforations in the apices of such corrugations, and I make no claim generally to drums so constructed.

I claim—

In the rotating drum of a washing-machine the combination of heads or ends, a periphery formed with corrugations composed of flat and perforated sides having rounded angles or corners, with angle-irons riveted at intervals into the corrugations and having at their ends screwed pins or studs extending through the heads and nuts on the pins for the purpose of tying the ends of the drum together and stiffening the whole drum, substantially as described.

In witness whereof I have hereunto set my hand in presence of two witnesses.

THOMAS HENRY.

Witnesses:
 GEO. J. N. FRANKLIN,
 WILLIAM ANDERSON SMITH.